United States Patent [19]

Schneider

[11] 3,870,121

[45] Mar. 11, 1975

[54] AIR CUSHION VEHICLE

[76] Inventor: Ralph W. Schneider, 15 Easterbrooke Ave., Willowdale, Ontario, Canada

[22] Filed: Dec. 4, 1972

[21] Appl. No.: 311,842

[52] U.S. Cl. .............................. 180/117, 180/120
[51] Int. Cl. ............................................... B60v 1/14
[58] Field of Search ........... 180/116, 117, 120, 124, 180/126

[56] References Cited
UNITED STATES PATENTS

| | | | |
|---|---|---|---|
| 3,291,242 | 12/1966 | Tinajero | 180/116 |
| 3,292,721 | 12/1966 | Dobson | 180/120 |
| 3,468,394 | 9/1969 | Winter | 180/117 |
| 3,605,938 | 9/1971 | Davis | 180/120 |

FOREIGN PATENTS OR APPLICATIONS

| | | | |
|---|---|---|---|
| 1,242,059 | 8/1971 | Great Britain | 180/120 |

*Primary Examiner*—David Schonberg
*Assistant Examiner*—Terrance L. Siemens

[57] ABSTRACT

An air cushion vehicle has a single power source driving two fans, one mounted in each side of the vehicle. One of the fans drives air beneath the vehicle for lift; and the other fan drives air rearwardly from the vehicle for thrust. A controllable baffle plate is mounted in the thrust flow, to divert some or nearly all of the flow forwardly through a duct having a forward facing exit. The forward speed of the vehicle is thus controlled, and the vehicle may have zero or negative forward speed if a sufficient flow of thrust air is diverted forwardly. At least a bleed of thrust air flows rearwardly at all times, past steering vanes, to allow steering control at all vehicle speeds. The fans operate at substantially a constant speed, providing substantially constant air flow.

7 Claims, 7 Drawing Figures

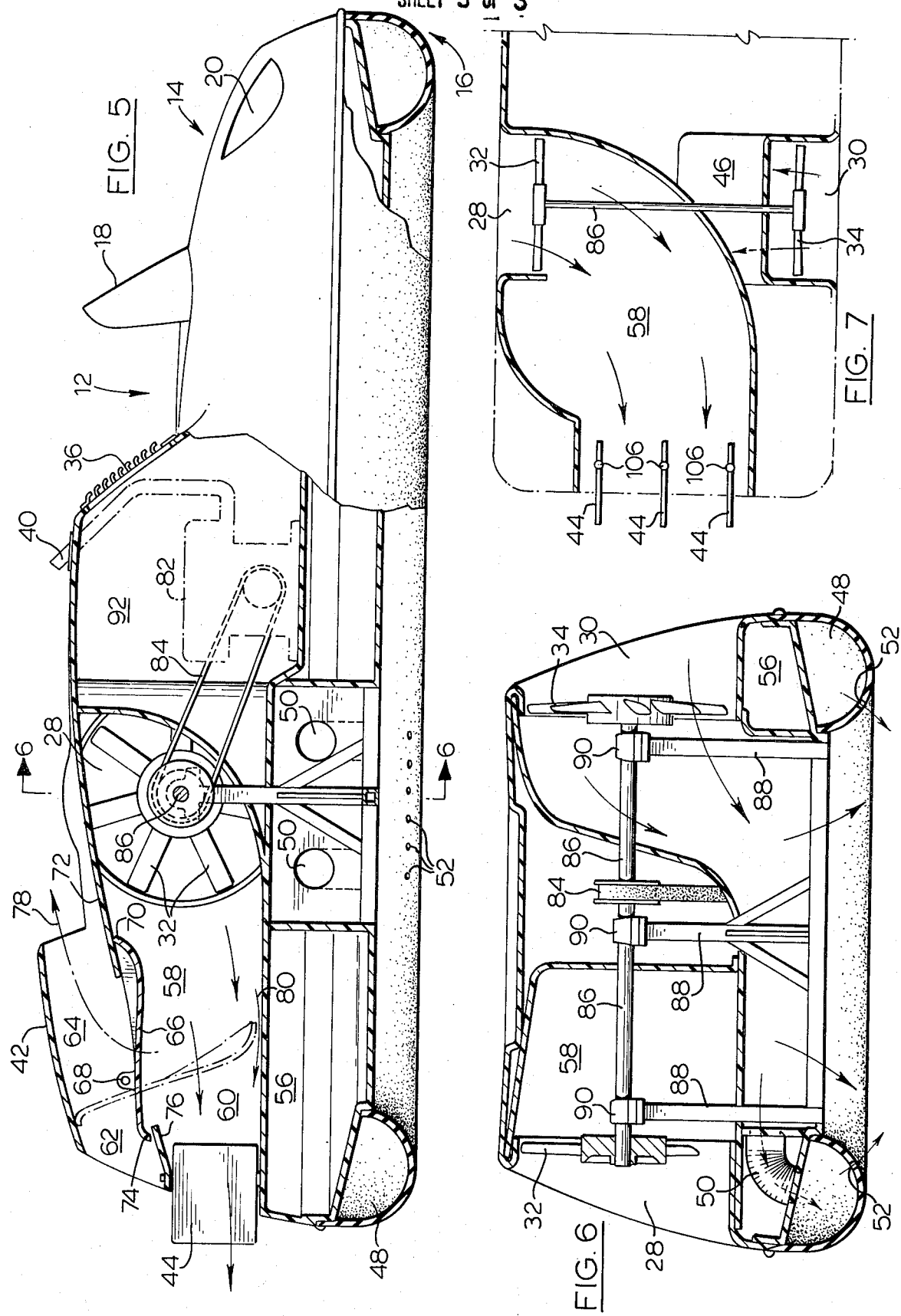

AIR CUSHION VEHICLE

FIELD OF THE INVENTION

This invention relates to an air cushion vehicle, particularly one which is powered from a single power source driving two fans, one for lift and one for thrust, at substantially constant rotative speed, and thus substantially constant rate of air flow. The speed of the vehicle — i.e. the rate of movement of the vehicle — may be controlled by controlling the amount of thrust air flowing from the vehicle in an operative sense; and the invention provides a vehicle having steering control at all speed including zero speed (hover) and reverse.

BACKGROUND OF THE INVENTION

Ground effect vehicles of the sort which operate over a cushion of air forced beneath the vehicle are well known. Normally, a flow of air is forced beneath the frame of a vehicle — often into a plenum chamber defined by skirts hanging from the vehicle — by a fan operating for that purpose and so as to create and maintain a pressurized mass or blanket of air beneath the vehicle so as to provide lift therefor. Other fans, blowers or propellers are then employed to obtain forward thrust of the vehicle so that it may move over the terrain, including land, water, swamp land etc., with relative ease. Such vehicles have, however, been extremely noisy, and have usually been dependent upon forward motion of the vehicle in order to obtain steering control. Very often such ground effect vehicles have a plurality of motors for thrust and steering control, as well as having other motors for lift.

Normally, an air cushion vehicle — or ground effect vehicle as they sometimes be called — may be powered by such power plants as internal combustion engines or gas turbines, depending particularly upon their size. In any event, air cushion vehicles as they have been known in the past have been very noisy, because it is not usually possible to shroud or otherwise sound insulate a power plant which may operate at varying speeds. Still further, in many of the prior art air cushion vehicles there are a plurality of thrust power plants mounted above or at the sides of the vehicle. Generally speaking, there has not been a provision in the prior art air cushion vehicles for modifying or regulating the amount of air flowing in a thrust-inducing manner relative to the vehicle; that is, there has not generally been provision for deflecting or diverting an essentially constant flow of air so that all or a portion of that flow is reactive with respect to the vehicle so as to provide forward thrust therefor while the deflected or diverted portion either acts against the vehicle to provide negative forward thrust or is otherwise non-reacting in the fore-to-aft [i.e. thrust] direction. In the prior art vehicles which generally rely upon the control of the speed and quantity of thrust air rearwards from the vehicle so as to adjust the forward speed of the vehicle, it very often happens that steering control of the vehicle at very low speeds may be very poor to virtually non-existant. Thus, it may sometimes be necessary to briefly accelerate the thrust power plants on such vehicles so as to provide a stream of air against which the rudders or steering vanes for the vehicle may operate. Thus, docking or otherwise bringing the vehicle to a designated stopping place such as a dock or a slip under its own power. Still further, the prior art air cushion vehicles have usually been adapted only to provide thrust in a forward direction, and not in a reverse direction.

The present invention provides an air cushion vehicle where a single power source drives two fans, each of which is in communication with a separate duct system. The first fan provides a flow of air through a first duct to beneath the vehicle — or at least the generally rigid frame thereof — so as to provide lift for the vehicle. The second fan provides a flow of air directed generally rearwards within the vehicle to thrust control apparatus, whereby the speed of the vehicle can be controlled. In the preferred embodiment discussed hereafter, the power source is adapted to drive both fans which are mounted in either side of the vehicle on a common shaft, and the fans are driven at a constant speed so that there is a substantially constant air flow delivered from each of the fans.

The substantially constant air flow which is delivered for the lift of the air cushion vehicle of the present invention is exhausted from a duct to beneath the frame of the vehicle. Around the periphery of the frame there may be suspended appropriate skirts to define a plenum within which the lifting air cushion is confined, and the flow of air passes from beneath the vehicle and beneath the skirts around the periphery or rearwards of the vehicle, depending on the speed at which the vehicle is operating. There may also be provided beneath the frame of the vehicle and around its periphery an inflatable chamber having a plurality of bleed vents therein, which is somewhat more stable in defining the plenum beneath the vehicle and in providing appropriate lift for the vehicle during manoeuvre such as turning at relatively high speeds. Flotation chambers may also be mounted beneath or within the frame of the vehicle.

The thrust control means for the air cushion vehicle of the present invention operates to control the quantity of thrust air flow which is directed rearwardly in a duct from the second fan which operates at a substantially constant speed to provide the thrust air. For very high speed operation, of course, all are or substantially all of the thrust air provided from the fan is directed rearwardly from the vehicle so as to react against the vehicle in the appropriate manner. At lower speeds, a portion of the thrust air is directed upwardly and forwardly from the rear of the vehicle so as to provide the rearward thrust for the vehicle, and so as to have either zero effect or a somewhat negative effect as to the net thrust air flow reaction with respect to the vehicle and the resolution of that reaction in terms of positive thrust forces. In other words, a portion of the substantially constant air flow intended to provide thrust power for the vehicle is deflected away from providing forward thrust, and the vehicle operates at a lower speed. Indeed, substantially all of the constant flow of air intended to provide the thrust power for the vehicle may be deflected forwardly so as to provide negative thrust or reverse thrust operation for the vehicle. At all speeds, however, at least a portion of the constant flow of air coming from the second fan which provides the thrust air for the vehicle is bled rearwardly from the thrust control of the vehicle over at least one or a plurality of steering vanes, and the quantity of air which passes over the steering vanes is such that steering control for the vehicle is provided even at very low forward and reverse speeds, as well as at zero forward speed.

The thrust control for the vehicle of the present invention includes a controllable valve means which may be considered to be a movable baffle plate or butterfly within the thrust duct. As will be explained hereafter, the vehicle may be considered to have forward and reverse thrust ducts, and the baffle plate is mounted with respect to the thrust ducts so as to control the relative degree of communication between them, and thereby to control the forward speed of the vehicle, even in a negative forward, i.e. reverse, sense.

As noted, in an air cushion vehicle in accordance with this invention, the two fans which operate to provide lift air and thrust air flows respectively may be mounted in opposite sides of the vehicle in appropriate housings. The fans are conveniently mounted on a common shaft, at opposite ends thereof, in the sides of the vehicle; and they are powered from a single power source such as an internal combustion engine or gas turbine. Also as noted, it is a feature of this invention that the power source can be operated at a substantially constant speed, so that the operating characteristics of the power source and the fans may be both studied and designed to provide more quiet and more efficient operation of the air cushion vehicle of this invention. A throttle is, of course, provided although not generally used in normal operation of the air cushion vehicle. Thus, control of the vehicle may be such as to be a simple two lever operation, where one lever or control stick operates and controls the steering control vanes of the vehicle, and the other lever or control stick operates the thrust control apparatus whereby the amount of flow of thrust air rearwardly of the vehicle is controlled. Of course, the levers or either of them may be replaced with pedals, such as rudder control panels of the sort found in air craft which may replace the steering control lever. In any event, control of an air cushion vehicle which is constructed in accordance with this invention is extremely easy, and may be mastered with a minimum of instruction and practice time.

An air cushion vehicle according to this invention may therefore be produced as a sports or recreation vehicle, as well as for the purposes of a working or utility vehicle. Hunters, fishermen, air craft pilots etc. may easily find sports or recreational uses for an air cushion vehicle in accordance with this invention; and at the same time, such a vehicle may be useful to persons including trappers, game wardens, utility linemen etc. as well as for conveying or hauling cargo or passengers.

BRIEF SUMMARY OF THE INVENTION

It is an object of the invention to provide an air cushion vehicle which may be easily and inexpensively produced, and which may be easily controlled when in operation.

A further object of this invention is to provide an air cushion vehicle whose lift and thrust fans are powered from a single power source.

A still further object of this invention is to provide an air cushion vehicle with a single power source and fans for producing separate flows through separate ducts of lift air and thrust air, where the amount of thrust air permitted to flow rearwardly from the vehicle in a reactive sense with respect to its effect on the speed of the vehicle may be controlled.

Yet another object of this invention is to provide an air cushion vehicle which has steering control at all speeds.

A still further object of the invention is to provide an air cushion vehicle which may be operated, with steering control, in a reverse direction of travel to the usual direction of travels of such vehicle.

BRIEF DESCRIPTION OF THE DRAWINGS

These and other features and objects of the invention are more clearly discussed hereafter in association with the accompanying drawings, in which

FIG. 5 is a side view in partial cross-section particularly showing the thrust control and illustrating air flow from the thrust air fan;

FIG. 6 is a cross-section looking forward in the vehicle along the lines 6—6 in FIG. 5, and FIG. 7 is a schematic plan view looking downwards at the rear portion of the vehicle.

DESCRIPTION OF THE PREFERRED EMBODIMENT

Figure 1:
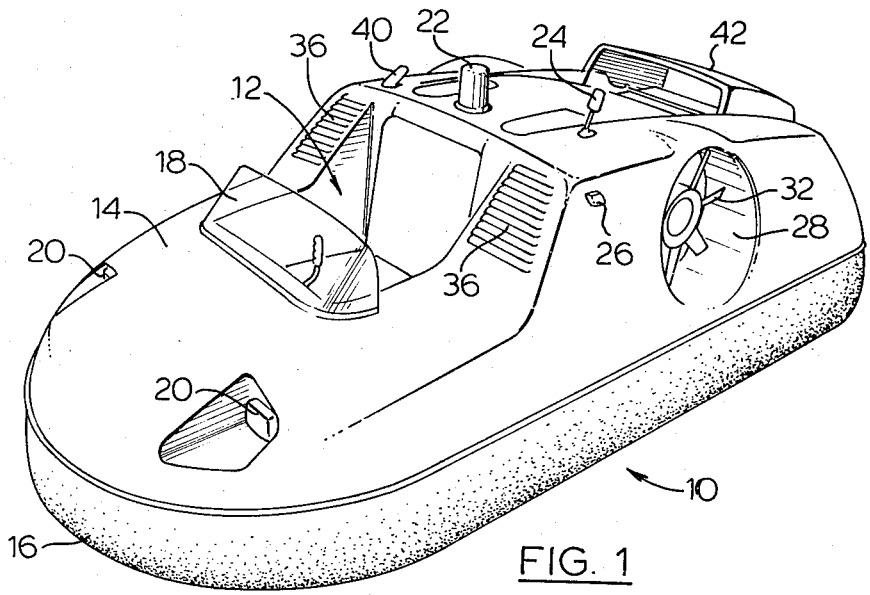
FIG. 1 is a perspective view of an air cushion vehicle according to this invention, from the front left quarter of the vehicle.
Figure 2:
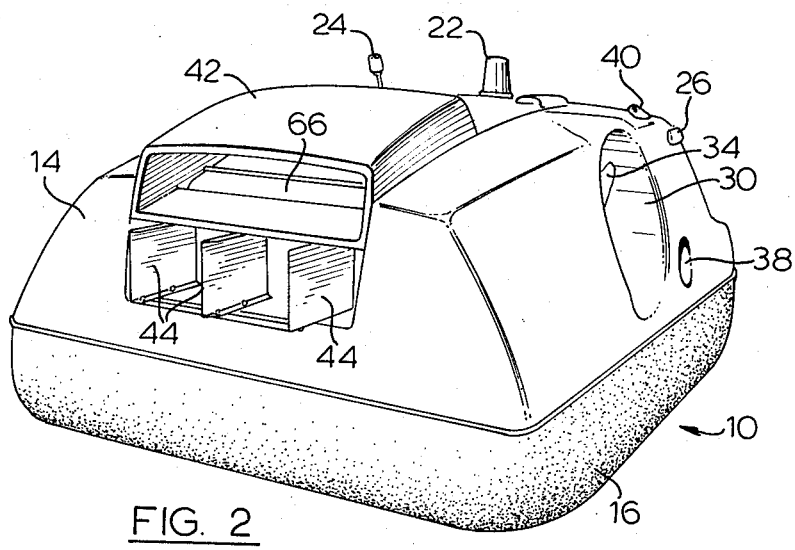
FIG. 2 is a perspective view of an air cushion vehicle according to this invention, from the rear right quarter of the vehicle.

An air cushion vehicle 10 is shown in FIGS. 1 and 2 from the front left quarter and the rear right quarter, respectively. The air cushion vehicle, in this case, is a simple one place vehicle; that is, the vehicle has a seating capacity only for the operator, but all of the principles embodied by this invention are to be found in the illustrated vehicle. As noted, such a vehicle may be used as a sports or recreation vehicle; or it may be used for carrying or towing cargo, or with an additional seating capacity for passengers, etc.

The air cushion vehicle 10 has an operators seat or cockpit 12 near the front of the vehicle, with a general frame portion 14 and a skirt portion 16 beneath the frame of the vehicle. In the vehicle illustrated, a windshield 18 is provided in front of the cockpit 12, and the vehicle may be provided with head lamps 20, beacon 22 and running lights 24 and 26. The rear portion of the vehicle 10 has a pair of fan ports 28 and 30 in the left and right sides of the vehicle, respectively. Fans 32 and 34 are mounted in ports 28 and 30, respectively, and may be identical or different, depending on the desired amount of air flow to be produced by the fan for operation of the vehicle. The air flow ducts, fans and power source for the vehicle are mounted within the rear portion thereof, and supported by the vehicle frame. Thus, immediately behind the cockpit 12 there may be an engine compartment in which a suitable internal combustion engine or gas turbine may be mounted for driving the fans, as discussed hereafter. Ventilation grilles 36 may be mounted in the front of the engine compartment, and an air intake 38 for the engine may be provided such as in the right side of the vehicle as shown in FIG. 2. An exhaust for consumed gases from the engine is provided at 40.

A duct cover 42 is placed over a portion of the rear part of the vehicle 10, as discussed in greater detail hereafter. The duct cover 42 defines a duct which is generally open at both its front and rear, as noted in FIGS. 1 and 2 respectively. One or more steering vanes 44 are mounted at the rear of the vehicle 10 as discussed in greater detail hereafter.

Broadly speaking, air flow created by fans 32 and 34 is directed into one of two duct systems, one for thrust and one for lift; and, of course, it is immaterial to the invention whether the left or the right fan is used for either purpose. In the vehicle illustrated, air from the left fan 32 is directed rearwardly to provide thrust for the vehicle, and air from the right fan 34 is directed downwardly to provide lift for the vehicle.

Referring now to FIGS. 6 and 7, it will be noted that air from the fan 34 is directed into a duct indicated generally at 46, and thence downwardly to beneath the frame of the vehicle 10. A plenum is defined beneath the vehicle by a skirt or other means, including such means as an inflatable tube 48. As air is forced beneath the vehicle from fan 34 through duct 46, a portion of the pressurized air is fed through ducts 50 into the inflatable tube 48, from whence it may bleed through a plurality of openings 52. The design of the vehicle, especially of the sizes of ports 50 and openings 52 would, of course, be such as to assure that tube 48 is maintained in inflated condition while air is forced beneath the vehicle from fan 34 through duct 46. The use of an inflatable skirt such as tube 48 having inwardly directed bleed openings 52 permits the vehicle to be operated over water. In addition, chambers such as those indicated at 56 may be provided where the chambers 56 are flotation chambers.

Referring now to FIGS. 5, 6 and 7, it will be noted that air from the fan 32 is directed into a duct indicated generally at 58. That duct leads the air rearwardly to the thrust control apparatus for the vehicle, including steering apparatus. Duct 58 may, at any one time, communicate with a duct indicated generally at 60, or duct 60 together with a duct indicated generally at 62, or those ducts together with a duct indicated generally at 64. The control of the flow of air from duct 58 is determined by the position of a thrust control plate or baffle plate 66 which effectively forms a controllable valve means. Baffle plate 66 is supported by the frame of the vehicle and is hinged thereto as at 68.

The duct 60 may be considered to be the forward thrust duct, because if all of the air from fan 32 is directed through duct 60, the reactive effect of that air flow on the vehicle is to provide thrust to the vehicle in a forward direction. Similarly, duct 64 may be referred to as the reverse thrust duct because the reactive effect of substantially the entire flow of air from fan 32 [except for a small amount which is bled pass the steering vanes 44 at all times] is such as to tend to cause the vehicle 10 to move in a backwards or reverse direction. The duct 62 may be in communication with either ducts 60 or 64, or both of them, as discussed hereafter.

By positioning the baffle plate 66 downstream of duct 58, and providing suitable relationships between the dimensions and shape of design of the baffle plate 66, thrust control of the vehicle is accomplished as follows:

If the baffle plate 66 is swung about hinges 68 so as to assume the position shown in solid lines in FIG. 5 — i.e., substantially horizontal — stop means such as the intereference of the front end 70 of baffle plate 66 with the upper wall 72 of duct 58, and the interference of the rear end 74 of baffle plate 66 with the upper duct wall 76 of duct 60, provides a substantially total communication from duct 58 to duct 60. Thus, all of the air which is directed from fan 32 rearwardly through duct 58 is directed through duct 60 and exhausts at the rear end thereof past steering vanes 44. If, however, the baffle plate 66 is positioned so that the rear end 74 thereof interferes with the duct cover 42 — as shown in chain line in FIG. 5 — then a major portion of air from fan 32 directed rearwardly through duct 58 is re-directed upwardly by the baffle plate 66 to exhaust forwardly through duct 64. This is indicated by arrow 78 in FIG. 5. Thus, a reactive effect on the vehicle 10 by the exhaust of the thrust air forwardly through reverse duct 64 is such as to cause or at least tend to cause the vehicle to move in a backwards or reverse direction.

It should be noted that when the baffle plate 66 is positioned so as to provide maximum reverse thrust effect on the vehicle 10, a minor portion of the air from fan 32 is bled past or beneath the baffle plate 66 such as indicated by arrow 80 in FIG. 5. That minor portion of air flow which passes rearwardly beyond baffle plate 66 when in its full reverse thrust position provides a sufficient flow of air past the steering vanes 44 so that steering control of the vehicle is maintained, even at zero forward speed or at low speeds in either the forward or reverse direction.

When the baffle plate 66 is placed in an intermediate position, a portion of the air flowing rearwardly through duct 58 from fan 32 may be re-directed upwardly and forwardly from duct 58 through duct 64, whereas other portions of the air pass beyond the baffle plate 66 through duct 60 and possibly also through duct 62. In any event, when the vehicle 10 is moving forward, there may be some rearward flow of air from duct 64 to duct 62 over the rear end 74 of the baffle plate 66. This is especially true at very high forward speeds when the baffle plate 66 is in its full forward thrust position; and air flowing over the top of the vehicle 10 — which is aerodynamically designed — will flow rearwardly through duct 64 to duct 62. In such cases, the duct cover 42 which defines the upper portions of duct 64 and 62, acts as a vane so that resistance to forward motion is minimal.

It can be seen, therefore, that the air cushion vehicle is built with a substantially rigid frame, at least so as to withstand the forces imposed upon it by the weight of the other working parts of the vehicle, as well as loads imposed upon the frame during operation of the vehicle. A suitable power source is, of course, provided within the vehicle, as indicated at 82, and may be an internal combustion engine or gas turbine. Drive means such as a belt 84 are provided to drive the fans 32 and 34 which are conveniently mounted at either end of a shaft 86. [Of course, it should be mentioned that the shaft 86 may be split on either side of belt 84 so that fans 32 and 34 may operate at different speeds; and that in any event fans 32 and 34 may differ in their design depending upon the air flow requirements for lift and thrust of the vehicle.] The shaft 86 may conveniently be mounted on frame members 88, and journaled in bearings 90. It is convenient to operate the power source 82 at a constant speed, particularly because the requirements for a flow of air beneath the vehicle to provide lift are substantially constant; whereas it is convenient also to provide only a single source of power rather than multiple sources of power as in most prior art air cushioned vehicles. However, when fan 32 is operating at a substantially constant speed, there is a substantially constant flow of air therefrom which is directed therefrom rearwardly through duct 58; and control of the forward — or reverse — speed of the vehicle is effected by control of the position of the baffle plate 66.

[A prototype single seat air cushion vehicle in accordance with this invention has been successfully flown over ice at speeds in excess of 75 miles per hour. The vehicle has also been successfully operated at lower speeds, including zero speed and reverse, with full steering control.]

Because of the constant speed operation of the fans 32 and 34, lift for the vehicle 10 is assured at all times when the power source 82 is operating and driving the fans. As the forward speed of the vehicle increases, more air from fan 32 is directed rearwardly over the steering vanes 44, so that steering reaction of the vehicle is assured at all times. Thus, at very low speeds, zero or reverse, there may be very little air flowing rearwardly through duct 60 and past the steering vanes 44, but such flow is sufficient for steering control at those speeds and is assured because of the constant speed operation of fan 32. Zero forward speed is determined from a proper positioning of the baffle plate 66 so that the forward and reverse reactive thrusts against the vehicle from air exhausting from ducts 60, 62 and 64 are essentially cancelled in the fore-to-aft direction.

As noted above, when the power source 82 is operated at a substantially constant speed, the design of the power source may be chosen so as to be most efficient at a given speed. Also, the engine compartment which is indicated generally at 92 in FIG. 5 may be shrouded or otherwise efficiently sound proofed, especially when the noise eminating from the power source 82 may be reasonably predicted because of its constant speed operation.

Figure 3:
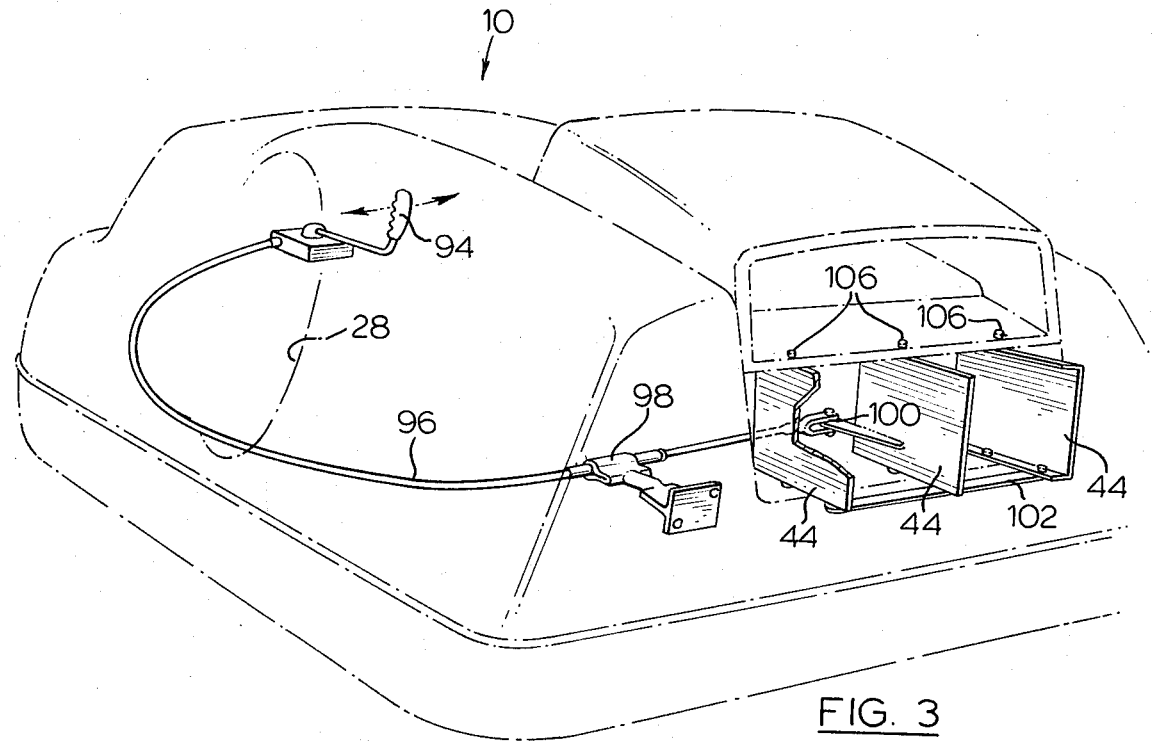
FIG. 3 is a view showing the relationship of the steering control vanes to the vehicle.
Figure 4:
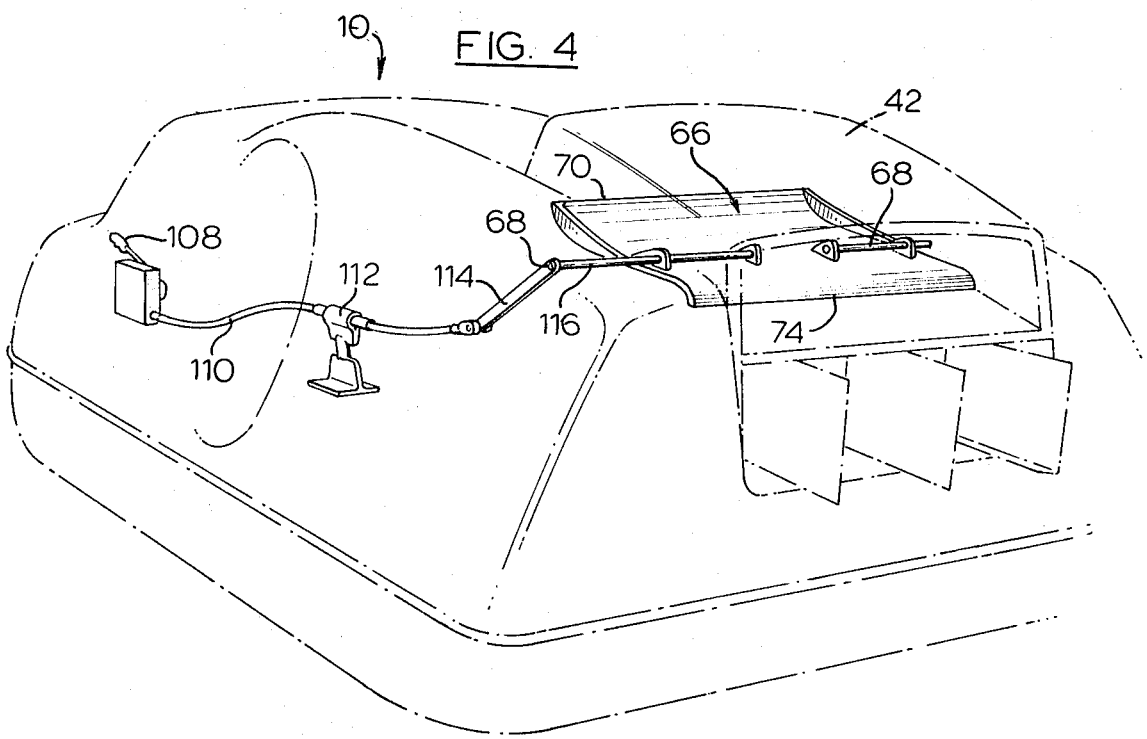
FIG. 4 is a view similar to FIG. 3 showing the relationship of the thrust air control apparatus to the vehicle.

The steering control of an air cushion vehicle 10 in accordance with this invention is illustrated in FIG. 3. A steering lever or control stick 94 is mounted in the cockpit 12, and is conveniently mechanically connected to at least one of the steering vanes 44 by way of cable 96. The cable may be mounted and supported to the frame of the vehicle as at 98, and hingedly secured to the one or plurality of the steering vanes 44 by a hingeable pin arrangement such as shown at 100 in FIG. 3. Also, the steering vanes 44 may be attached at their leading or trailing edges such as illustrated in FIG. 3 where the connecting bars 102 are hingedly secured near the trailing edges of each of the steering vanes 44 at pins 104. Each of the steering vanes 44 is hingedly secured to the frame of the vehicle as at 106. Sideways operation of the steering lever 94 results in sideways operation or swinging of the steering vanes 44 about their respective hinges 106; and because there is always a flow of air passed the steering vanes 44 when the vehicle is being operated, steering control of the vehicle can thereby be effected.

The forward speed of the vehicle — or thrust control — is operated from a speed or thrust control lever 108 which is also mounted in the cockpit 12. Thrust control lever 108 is connected by cable 110 which is supported at 112 to a control lever or arm 114 which is secured to an arm 116 hinged to the frame of the vehicle at 68, whereby the baffle plate 66 is hingedly supported. Operation of the thrust lever 108 changes the position of the baffle plate 66 relative to the duct 58 and controls the degree of communication from duct 58 with ducts 60, 62 and 64. As discussed above, the thrust and thereby the speed of the vehicle is affected by the amount of air flowing from the thrust fan 32 through either or both of ducts 60 and 64 — being the forward and reverse thrust ducts respectively.

Throttle means and other engine control means, electrical controls etc. are also suitably mounted in the cockpit 12. The throttle for the engine or power source 82 may be required from time to time depending on the conditions in which the vehicle is operating such as conditions of extreme heat or cold, high altitude etc.

There has been described an air cushion vehicle where a single power source operating at a substantially constant speed is utilized to provide both lift air as well as thrust air flows for the vehicle. The thrust, and thereby the speed of the vehicle, is controlled by controlling the position of a movable or controllable valve in the thrust air duct, whereby the amount of air flowing rearwardly from the forward thrust duct may be varied. The vehicle has steering control at all speeds, including zero forward speed and reverse, because at least a minor portion of the flow of air from the thrust fan is bled past the thrust control baffle plate and over at least one or a plurality of steering control vanes. Operation of the vehicle is extremely simple, comprising effectively the operation of a steering control lever and a thrust control lever.

The principles discussed above with respect to an air cushion vehicle in accordance with this invention may be applied to air cushion vehicles of varying sizes, including cargo vehicles and ones intended for use as passenger carrying vehicles. Modifications to the design of the vehicle and to the components thereof may be made without, however, departing from the spirit and scope of the appended claims.

What I claim is:

1. In an air cushion vehicle:
   a rigid frame;
   a power source driving first and second axial flow fans at a constant r.p.m. to deliver a substantially constant flow of air from the two fans during operation of the vehicle;
   first duct means communicating with said first fan so as to direct a first flow of air therefrom to beneath said rigid frame;
   second duct means communicating with said second fan so as to direct a second flow of air rearwardly therefrom to a thrust control means;
   said thrust control means including:
   at least one steering control vane;
   forward and reverse thrust ducts in communication with each other, and a controllable valve means supported by said rigid frame and positioned downstream of said second duct means and relative to said second flow of air so as to control both the degree of communication between said forward and reverse thrust ducts and the amount of said second flow of air being directed to each of said forward and reverse thrust ducts;
   and means for permitting a portion of said second flow of air to pass continuously over said at least one steering control vane; said forward thrust duct comprising a third duct means having said at least one steering control vane mounted therein, and a fourth duct means being located proximate to said third duct means and in communication, under the control of said controllable valve means, with said reverse thrust duct and said second duct means.

2. The air cushion vehicle of claim 1, wherein said controllable valve means is a movable baffleplate mounted in a space common to and at the junction of said second duct means, said reverse thrust duct, and said third and fourth duct means;

said baffleplate being movable to any position between and including a first extreme position where at least a major portion of said second flow of air is directed to said third duct means, and a second extreme position where a major portion of said second flow of air is directed to said reverse thrust duct.

3. The air cushion vehicle of claim 2 where said baffleplate is mounted so that in said first extreme position there is communication between said reverse thrust duct and said fourth duct means; and in said second extreme position there is substantially no communication between said reverse thrust duct and said fourth duct means.

4. The air cushion vehicle of claim 3 where a plurality of steering control vanes is mounted in said third duct means.

5. The air cushion vehicle of claim 2 where said fourth duct means is a rearward extension of said reverse thrust duct means; said baffleplate being mounted so that movement of said baffleplate to said second extreme position precludes communication between said reverse thrust duct and said fourth duct and directs the major portion of said second flow of air from said second duct means to said reverse duct, while allowing a minor bleed portion of said second flow of air to flow to said third duct means; and movement of said baffleplate to said first extreme position directs the major portion of said second flow of air from said second duct means to said third duct means, while permitting communication between said reverse thrust duct and said fourth duct means.

6. The air cushion vehicle of claim 1 where said first duct means directs said first flow of air through a substantially 90° turn to beneath said rigid frame from a first fan port on one side of said vehicle wherein said first axial flow fan is mounted; and said second duct means directs said second flow of air through a substantially 90° turn to said thrust control means from a second fan port on the other side of said vehicle wherein said second axial flow fan is mounted.

7. The air cushion vehicle of claim 6 where said first and second axial flow fans are mounted at opposite ends of a common shaft which extends transversely across the longitudinal axis of said vehicle towards said first and second fan ports.

* * * * *